Patented May 31, 1938

2,118,954

UNITED STATES PATENT OFFICE 2,118,954

HYDROGENATION OF PHENOL-KETONE CONDENSATION PRODUCTS

Raymond E. Thomas, Newburgh, N. Y., assignor to E. I. du Pont de Nemours & Company, Wilmington, Del., a corporation of Delaware No Drawing. Application March 19, 1936, Serial No. 69,667

16 Claims. (Cl. 260—153)

This invention relates to a process for completely hydrogenating phenol-ketone condensation products and to the production of certain new and useful products.

It has heretofore been proposed to hydrogenate phenol-ketone condensation products employing as catalysts nickel, colloidal palladium, or platinum black, the reaction being carried out under pressure, in the absence of a solvent, and at temperatures varying between 50 and 170° C. Thus, in U. S. 1,593,081, issued July 20, 1926, to Jordan, it is disclosed that di(4-hydroxy-3-methyl-phenyl) dimethylmethane may be completely hydrogenated by reacting the same with hydrogen under pressure at 150° C. to 170° C., and in the presence of 2 to 5 parts of nickel catalyst. From this reaction Jordan obtained di(4-hydroxy-3-methylcyclohexanyl) dimethylmethane, which is described as a viscous, limpid oil boiling at 108–112° C./12 mm. and having a very agreeable scent resembling that of hyacinths.

It has been found that hydrogenation of 1,1-di(4-hydroxy-3-methylphenyl) dimethylmethane under pressure at 180 to 200° C. in the presence of a nickel catalyst and a solvent, e. g., ethanol, produces an entirely different product. My product is an odorless, semi-solid, plastic material having a boiling point of 180–190° C./2 mm. comprising a number of isomers that are difficult to separate. Similar results are obtained with 1,1-di(4-hydroxyphenyl)dimethylmethane, except that pure isomers may be isolated readily by fractional crystallization. The physical and chemical properties of the product obtained by hydrogenating di-(4-hydroxy-3-methylphenyl) dimethylmethane characterize it as di(4-hydroxy-3-methylcyclohexanyl) dimethylmethane, and since these properties are not those of Jordan's product we believe that Jordan erred in calling his product di(4-hydroxy-3-methylcyclohexanyl)-dimethylmethane. Further evidence to substantiate this belief is offered by an example in British 254,753 (complete acceptance 8/9/28), issued to Chemische Fabrik aus Aktien, in which di(4-hydroxy-3-methylphenyl) dimethylmethane was hydrogenated in an autoclave under pressure at 160 to 180° C. in the presence of a hydrogenating catalyst. From this reaction two products were isolated and identified as 2-methyl cyclohexanol and 2-methyl-4-isopropyl cyclohexanol, boiling point 112–115° C./12 mm. These products resulted from the cleavage of the starting material and subsequent hydrogenation of the fragments. The similarity of this process to that disclosed by Jordan in U. S. 1,593,081, and the close resemblance of the above 2-methyl-4-isopropyl cyclohexanol to the compound (boiling point 108–112° C./12 mm.) obtained by Jordan leads to the conclusion that they are identical. It follows, therefore, that there has been discovered a new process which yields hitherto unknown compositions of matter.

This invention has as an object the preparation of completely hydrogenated phenol-ketone condensation products. A further object is the development of a process for catalytically hydrogenating phenol-ketone condensation products to the corresponding completely saturated materials without cleavage of the starting material. A still further object is the preparation of certain new and useful compositions of matter. Other objects will appear hereinafter.

The above and other objects appearing hereinafter are accomplished by charging a solution of the phenol-ketone condensation product, in two or three times its weight of a suitable solvent, e. g., ethanol, into an autoclave equipped with an efficient stirrer and built to withstand high pressures and temperatures, adding about 10 to 20% of nickel catalyst, based on the weight of the material to be hydrogenated, and hydrogenating at elevated temperatures and pressures.

The following examples are to be taken as illustrative and not as limiting the invention.

Example 1

Forty-six hundred grams of di(4-hydroxyphenyl)dimethylmethane are dissolved in 12,000 grams of absolute ethanol and the solution charged into a high pressure autoclave, together with 800 grams of a nickel-on-kieselguhr hydrogenation catalyst. The mixture is stirred, treated with hydrogen at pressures ranging from 1500 to 2500 pounds per square inch, and heated to a maximum temperature of 200° C. Under these conditions hydrogen is absorbed rapidly, beginning at a temperature of 180° C., and the reaction is continued until no more hydrogen is absorbed. The solution is removed from the autoclave, filtered to remove the catalyst, and the solvent removed by distillation. The resulting product is treated with small portions of hot 5% aqueous sodium hydroxide solution until all alkali-soluble material is removed, and then washed with hot water until the washings are neutral to phenolphthalein. The crude hydrogenated di(4-hydroxyphenyl)dimethylmethane is a white, semi-solid, plastic mass, soluble in alcohol but insoluble in water and alkalis, B. P. 180-210° C./2 mm., consisting of a mixture of geometric isomers. By fractional crystallization first from alcohol-benzene mixtures and then from acetone, the product is separated into three fractions as follows:

One thousand grams of a pure solid isomer, M. R. 187-189° C.; 1500 grams of a mixture of solid isomers, M. R. 140-160° C.; and 1200 grams of mixed liquid isomers. The crude products may also be purified by fractional distillation, the mixture having a boiling point of 175-200° C./2 mm.

The hydrogenated di(4-hydroxyphenyl)dimethylmethane corresponds in its properties to di(4-hydroxycyclohexanyl) dimethylmethane which is represented by the following structural formula:

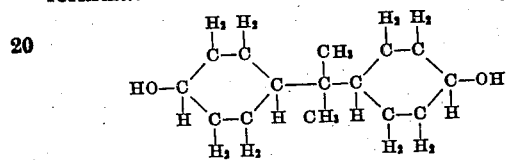

Analysis of the solid portion gives the following values: Calculated for $C_{15}H_{28}O_2$; carbon, 75%; hydrogen 11.67%. Found (high melting isomer): Carbon 74.96%; hydrogen 11.54; (mixed solid isomers) carbon 75.36; hydrogen 11.64. The presence of two secondary hydroxyls in the molecule is indicated by catalytic dehydrogenation over a selective dehydrogenation catalyst in accordance with the process described in the U. S. application by Wilbur A. Lazier, Serial No. 67,305 filed March 5, 1936 and issued as U. S. Patent No. 2,088,425 on July 27, 1937, whereby exactly two mols of hydrogen are liberated from each mol. of compound treated. The structural formula of di(4-hydroxyphenyl) dimethylmethane is well known, and this, in combination with the above facts is evidence for the foregoing structural formula for hydrogenated di(4-hydroxyphenyl)dimethylmethane. No evidence of the presence of hydrogenated cleavage products of di(4-hydroxphenyl)-dimethylmethane is found under the conditions of this experiment.

Example II

Fifty grams of di(4-hydroxyphenyl)dimethylmethane was dissolved in 200 cc. of butanol and the solution charged into a high-pressure autoclave, together with 10 grams of a nickel-on-kieselguhr hydrogenation catalyst. The mixture was treated with hydrogen at a pressure ranging from 1000 to 2000 pounds per square inch and heated at 180 to 190° C. for three hours. A product similar to that of Example I was obtained.

Example III

Thirteen hundred grams of di(4-hydroxy-3-methylphenyl)dimethylmethane are dissolved in 2600 grams of 95% ethanol and the solution charged into a high pressure autoclave together with 250 grams of a nickel-on-kieselguhr catalyst. The mixture is stirred, treated with hydrogen at pressures ranging from 2500 to 3000 pounds per square inch and heated to a maximum of 200° C. Beginning at 180° C. the hydrogen absorption is very rapid; the reaction is continued until no more hydrogen is taken up. The crude hydrogenated di(4-hydroxy-3-methylphenyl)dimethylmethane is isolated by filtering the resulting solution to remove the catalyst, and distilling off the solvent. The residual product is washed repeatedly with small portions of hot 5% sodium hydroxide solution to extract all alkali-soluble material, and is finally washed thoroughly with hot water until the washings are neutral to phenolphthalein. The hydrogenated di(4-hydroxy-3-methylphenyl)dimethylmethane, when thoroughly dried, is a white, semi-plastic, alkali-insoluble material that consists of a number of geometric isomers, the mixture having a boiling point of 180-195° C./1 mm. This product has the structure:

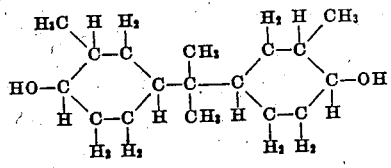

The presence of two secondary hydroxyls is indicated by catalytic dehydrogenation whereby exactly two mols of hydrogen per mol. of compound treated are obtained. The yield from 1300 grams of di(4-hydroxy-3-methylphenyl)dimethylmethane is approximately 1000 grams. Hydrogenated cleavage products of di(4-hydroxy-3-methylphenyl)dimethylmethane are not formed under the conditions of this experiment.

Example IV

A nickel hydrogenating catalyst is prepared according to the following procedure:

Five hundred and eighty grams of crystalline nickel nitrate are dissolved in 2,000 grams of distilled water, and 200 grams of finely divided kieselguhr added. The mixture is continuously stirred at a rate just sufficient to keep the kieselguhr and subsequent precipitate in suspension, and heated to 65 to 70° C. A 3.5% solution of sodium carbonate is then added through spray nozzles so placed as to deliver a fine mist-like spray uniformly over the surface of the mixture at the rate of 750 grams of solution per hour. Addition of the carbonate is continued until a filtered sample of the mother liquor has a pH of 7.6 to 7.8. Addition of precipitant is then stopped, and the mixture allowed to cool and settle. After decanting the mother liquor, the precipitate is washed at room temperature five times by decantation, each wash consisting of a volume of 0.15% ammonium carbonate solution equal to the volume of liquor decanted. The precipitate is then filtered and dried at a temperature not exceeding 110° C.

The product thus formed, which consists of basic nickel carbonate supported on kieselguhr, is very soft and crumbles easily to an extremely finely divided powder. It contains 30% nickel, 5-7% $CO_2$, and less than 0.02% $SO_4$.

One hundred grams of this powder is placed in a cylindrical reduction furnace of suitable size, preferably inclined at an angle of about 45°, and equipped with a slowly moving spiral agitator. The furnace is then heated at 450-500° C. while passing hydrogen through at the rate of 500 cc. per gram of catalyst per hour. After four to six hours reduction, the catalyst is cooled to room temperature in hydrogen flowing at a diminished rate. A catalyst so prepared contains 25 to 29% elementary nickel which represents 85 to 95% of the total available nickel.

Seventy-five grams of 1,1-di(4-hydroxyphenyl)cyclohexane is dissolved in 150 grams of ethanol, the solution mixed with 15 grams of nickel-onkieselguhr catalyst, and the mixture charged into a high pressure autoclave. The mixture is stirred, treated with hydrogen under pressures ranging from 1500 to 2500 pounds per square inch, and heated to a maximum temperature of 200° C. The absorption of hydrogen begins at 190° C. and the reaction is continued until no more hydrogen is taken up. The solution is discharged from the autoclave, filtered to remove the catalyst, and the product, 1,1-di(4-hydroxycyclohexanyl) cyclohexane, recovered as a mixture of solid isomers (melting point 220–240° C.) by crystallization from alcohol. Further crystallization from alcohol yields 5 grams of a pure solid isomer, M. R. 238–240° C., and 48.4 grams of a mixture of solid isomers, M. R. 220–230° C. The latter product is insoluble in water and alkalis, and only moderately soluble in organic solvents; catalytic dehydrogenation thereof yields 2 mols of hydrogen per mol. of product treated. Its properties correspond with the following structural formula:

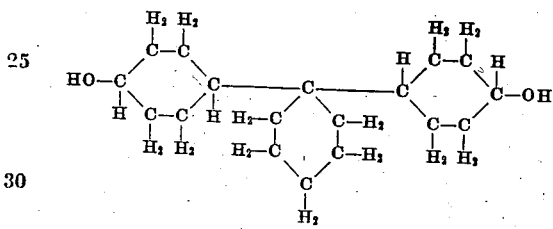

Although in the above examples there is indicated certain definite conditions of temperature, pressure, concentration, duration of reaction, catalyst and the like, it is to be understood that these values may be varied, since the specific conditions in any one case are determined both by the nature of the catalyst and by the material treated.

Broadly, the process of this invention is operable within the temperature range from approximately 175 to 250° C. and at pressures ranging from atmospheric to a maximum determined by the practical limitations of the equipment employed. It is preferable, however, to use temperatures from approximately 180° C. to 210° C., and pressures from 100 to 200 atmospheres. The most rapid absorption of hydrogen occurs between 190 and 200° C.

The use of a solvent in the practice of this invention is of special importance, since the formation of hydrogenated cleavage products is thereby avoided even at high temperatures. Although ethers, alcohols, or hydrocarbons may be used, the choice of a specific solvent is determined in each case by the solubility of the compound treated. Alcohols, such as methanol, ethanol and butanol, and ethers such as dioxan are generally preferred.

The catalysts of this invention include those catalysts of the Eighth Group of the Periodic Table which are commonly known as hydrogenating metals. These include nickel, platinum, and palladium, and they are employed in an extremely fine state of subdivision, either in the massive state or supported on suitable inert materials such as kieselguhr, activated charcoal, Filtercel, pumice, or magnesia. A typical method of preparing a supported catalyst is described in Example III. In general, a reduced nickel catalyst supported on kieselguhr is preferred in the practice of this invention.

The phenol-ketone condensation products of this invention are generally prepared by reacting substantially two mols of the phenol with substantially one mol. of the ketone in the presence of a suitable condensing agent, e. g., hydrochloric or sulfuric acids. The condensation products thus obtained have the general formula:

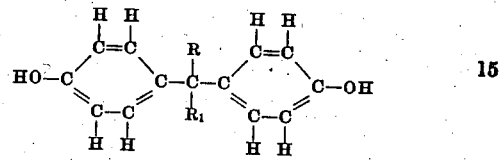

where R and R₁ may be like or unlike alkyl or cycloalkyl groups, and wherein one or more hydrocarbon radicals may be substituted for hydrogen atoms joined directly to either of the aromatic nuclei. Compounds coming within the scope of this type formula include the di(4-hydroxyphenyl) dimethylmethane, di(4-hydroxy-3-methylphenyl) dimethylmethane, and 1,1-di(4-hydroxyphenyl) cyclohexane of the examples, and others such as 1,1-di(4-hydroxyphenyl)4-tertiary-amyl-cyclohexane, di(4-hydroxynaphthyl) dimethylmethane, 2,2-di(4-hydroxyphenyl) decahydronaphthalene, 1,1-di(4-hydroxyphenyl) 3,5-dimethyl cyclohexane, and the like.

The process of this invention comprises essentially the addition of 12 atoms of hydrogen to the aromatic nuclei of compounds represented by the above type formula, in accordance with the following equation:

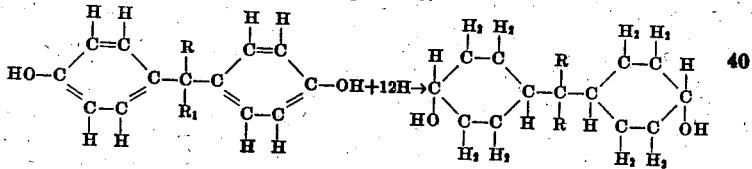

Among the compounds produced in this way from phenol-ketone condensation products may be mentioned di(4-hydroxycyclohexany) dimethylmethane, 1,1-di(4-hydroxycyclohexanyl) cyclohexane, di(4-hydroxy-3-methyl cyclohexanyl) dimethylmethane, 2,2-di(4-hydroxycyclohexanyl)-decahydronaphthalene, and the like.

This invention utilizes economical and highly efficient catalytic processes in the production of a large number of useful, but hitherto unavailable compounds. The process operates at moderate temperatures and pressures, and under these conditions hydrogenated phenol-ketone condensation products are formed in unusually high yields with a minimum of undesirable cleavage products. The hydrogenated products are isolated readily in the pure state by the method described in the examples. These products are of particular interest as intermediates in the preparation of polyhydric alcohol-polycarboxylic acid resins, etc., for the preparation of plasticizers, wax blending agents, coating compositions, insecticides, and the like. These compounds are also useful as modifying agents for lubricating oils, as gasoline antioxidants, and in the manufacture of rubber compositions. The specific uses for a given hydrogenated phenol-ketone condensation product are determined to a considerable extent by the properties and structure of the compound.

Since many widely different embodiments of this invention may be made without departing from the spirit or scope thereof, it is to be understood that we do not limit ourselves to the specific embodiments thereof except as defined in the following claims.

I claim:

1. A process for catalytically hydrogenating phenol-ketone condensation products which comprises reacting the phenol-ketone condensation product, dissolved in an organic solvent, with hydrogen in the presence of a hydrogenating catalyst at a temperature within the range of 175 to 250° C. and at elevated pressures.

2. The process in accordance with claim 1 characterized in that the temperature is within the range of 180–200° C.

3. The process in accordance with claim 1 characterized in that the pressure is within the range of 100–200 atmospheres.

4. The process in accordance with claim 1 characterized in that the organic solvent is selected from the class consisting of alcohols, ethers, and hydrocarbons.

5. The process in accordance with claim 1 characterized in that the catalyst is a hydrogenating metal selected from the elements of the Eighth Group of the Periodic Table.

6. The process in accordance with claim 1 characterized in that the reaction is carried out in the presence of a nickel-on-kieselguhr catalyst.

7. The process in accordance with claim 1 characterized in that the phenol-ketone condensation product is di(4-hydroxyphenyl)dimethylmethane.

8. The process in accordance with claim 1 characterized in that the phenol-ketone condensation product is di(4-hydroxy-3-methylphenyl) dimethylmethane.

9. The process in accordance with claim 1 characterized in that the phenol-ketone condensation product is 1,1-di(4-hydroxyphenyl)cyclohexane.

10. The process of catalytically hydrogenating phenol-ketone condensation products which comprises bringing di(4-hydroxyphenyl)dimethylmethane, dissolved in approximately three times its weight of ethanol, into contact with hydrogen in the presence of nickel-on-kieselguhr hydrogenating catalyst at a temperature within the range of 180–200° C. and under a pressure of 100–200 atmospheres.

11. The process of catalytically hydrogenating a phenol-ketone condensation product which comprises bringing di(4-hydroxy-3-methylphenyl)dimethylmethane, dissolved in approximately twice its weight of ethanol, into contact with hydrogen in the presence of a nickel-on-kieselguhr hydrogenating catalyst at a temperature within the range of 180–280° C., and under a pressure of approximately 100–200 atmospheres.

12. The process of catalytically hydrogenating a phenol-ketone condensation product which comprises bringing 1,1-di(4-hydroxyphenyl) cyclohexane, dissolved in approximately twice its weight of ethanol, into contact with hydrogen in the presence of a nickel-on-kieselguhr hydrogenating catalyst at a temperature within the range of 180–200° C. and under a pressure of approximately 100–200 atmospheres.

13. As a new composition the hydrogenated phenol-ketone condensation product, boiling above 170° C./2 mm. and corresponding to the general formula

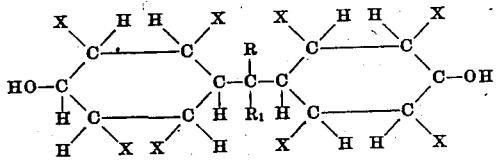

wherein R and R₁ are selected from the group consisting of like and unlike alkyl groups, and wherein X is selected from the group consisting of hydrogen and hydrocarbon radicals.

14. As a new composition the hydrogenated di(4-hydroxyphenyl)dimethylmethane product characterized by the following properties: odorless, white, tacky, semi-solid, plastic, B. P. 180–210° C./2 mm. pressure, soluble in alcohol, insoluble in water and caustic alkali and corresponding to the following structure:

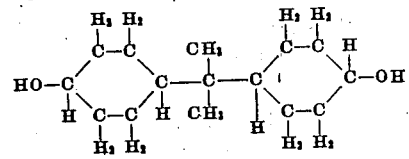

15. As a new composition the hydrogenated di(4-hydroxy-3-methylphenyl) dimethylmethane product characterized by the following properties: odorless, white, semi-plastic, B. P. 180–195° C./1 mm., soluble in alcohols, insoluble in water and caustic alkalis, and corresponding to the following structural formula:

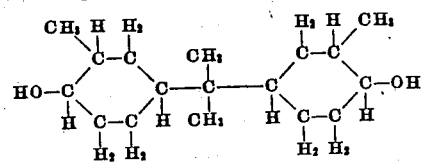

16. As a new composition the hydrogenated 1,1-di(4-hydroxyphenyl) cyclohexane product characterized by being an odorless, white solid, M. P. 220–240° C., insoluble in water and caustic alkalis, and soluble in hot alcohols, and corresponding to the following structural formula:

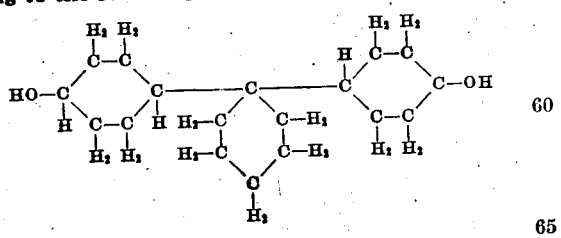

RAYMOND E. THOMAS.